United States Patent
Tanabe

(10) Patent No.: US 7,146,167 B2
(45) Date of Patent: Dec. 5, 2006

(54) NON-INSTANTANEOUS HARD HANDOVER CONTROL DEVICE AND METHOD

(75) Inventor: Yoichi Tanabe, Yokohama (JP)

(73) Assignee: NEC Corporation, Tokyo (JP)

( * ) Notice: Subject to any disclaimer, the term of this patent is extended or adjusted under 35 U.S.C. 154(b) by 103 days.

(21) Appl. No.: 10/525,337

(22) PCT Filed: Aug. 22, 2003

(86) PCT No.: PCT/JP03/10602

§ 371 (c)(1),
(2), (4) Date: Feb. 22, 2005

(87) PCT Pub. No.: WO2004/019636

PCT Pub. Date: Mar. 4, 2004

(65) Prior Publication Data

US 2006/0120325 A1 Jun. 8, 2006

(30) Foreign Application Priority Data

Aug. 22, 2002 (JP) .............................. 2002-241858

(51) Int. Cl.
*H04B 1/00* (2006.01)
*H04B 7/212* (2006.01)
*H04Q 7/20* (2006.01)

(52) U.S. Cl. .......................... 455/436; 455/69; 455/437; 455/438; 455/439; 455/440; 455/441; 455/442; 455/432.1; 455/517; 455/522; 455/525; 370/320; 370/321; 370/324; 370/331; 370/335; 370/342; 370/455

(58) Field of Classification Search .................. 455/69, 455/432.1, 437, 438, 439, 440, 442, 517, 455/522, 525; 370/320, 331, 335, 342
See application file for complete search history.

(56) References Cited

FOREIGN PATENT DOCUMENTS

| JP | 2000-50338 A | 2/2000 |
| JP | 2000-278206 A | 10/2000 |
| JP | 2000-278734 A | 10/2000 |
| JP | 2001-8262 A | 1/2001 |
| JP | 2003-273795 A | 9/2003 |

OTHER PUBLICATIONS

3GPP TS 25.433 version 4.5.0, Jul. 19, 2002, pp. 83 and 84.
Article entitled "3rd Generation Partnership Project; Technical Specification Group Radio Access Network; UTRAN Lub Interface NBAP Signalling"; 3GPP TS 25.433 V4.50; 2002-2006; pp. 82-84.

*Primary Examiner*—Joseph Feild
*Assistant Examiner*—Julio Perez
(74) *Attorney, Agent, or Firm*—Sughrue Mion, PLLC

(57) ABSTRACT

A non-instantaneous-disruption hard handover (HHO) control device includes a CFN generation block (110) for monitoring the state of a source baseband resource (201a) and a destination baseband resource (201b), generating a CFN which autonomously configures a switch timing so as to enable non-instantaneous-disruption HHO, transferring CFN information to the source baseband resource (201a) and destination baseband resource (201b). The device further includes HHO-information write-in/read-in blocks (205a, 205b) for writing radio information of the source baseband resource (201a), transferring the radio information to the destination baseband resource (201b), and enabling continuous communication by using the radio information.

7 Claims, 7 Drawing Sheets

FIG. 3

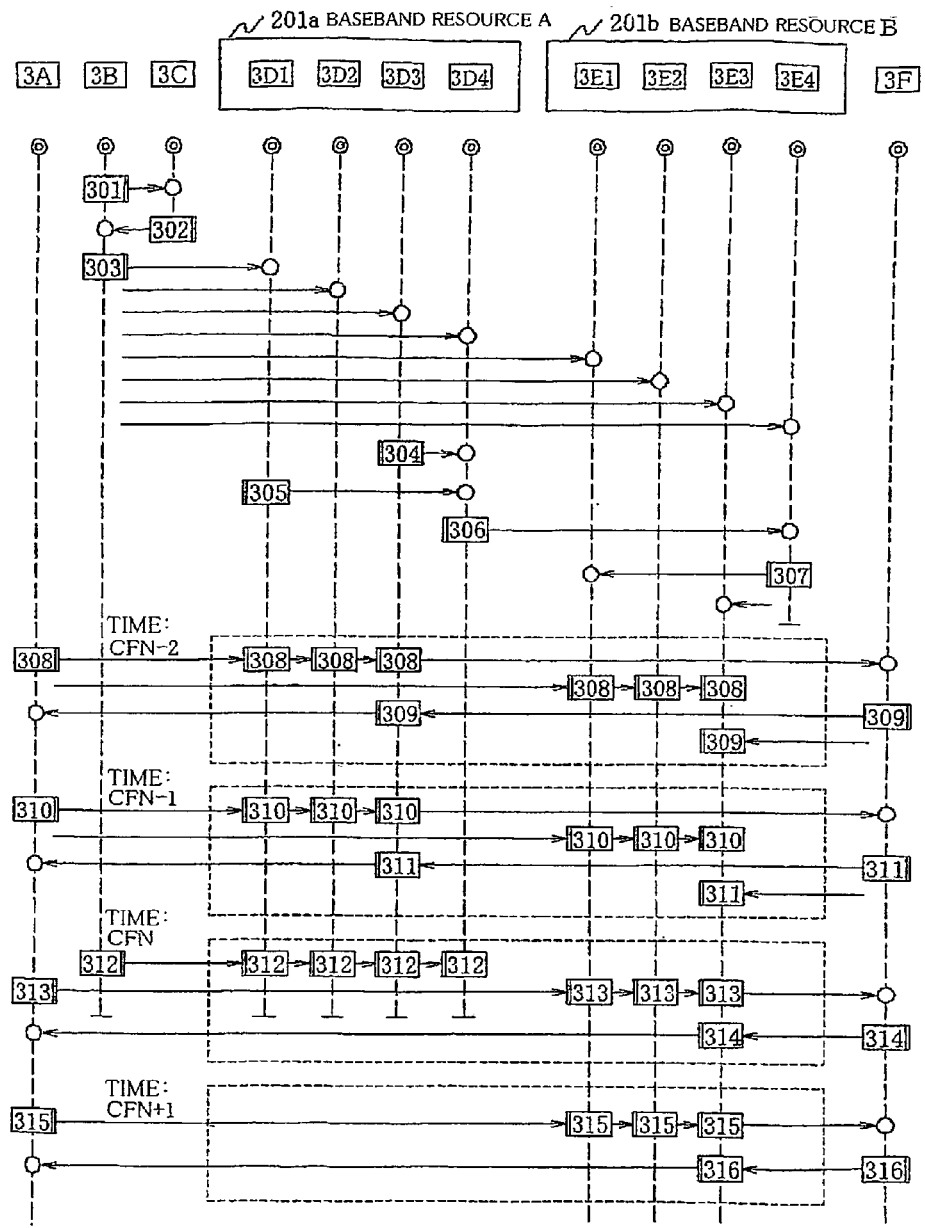

301~316···PROCESS
3A···A/D & D/A CONVERSION UNIT
3B···CALL-PROCESS/MAINTENACE-PROCESS
          MONITORING UNIT
3C···CFN GENERATION UNIT
3D1···SEARCH UNIT (BASEBAND RESOURCE A)
3D2···RAKE UNIT (BASEBAND RESOURCE A)
3D3···CODEC UNIT (BASEBAND RESOURCE A)

3D4···HHO-INFORMATION WRITE-IN/READ-IN UNIT
          (BASEBAND RESOURCE A)
3E1···SEARCH UNIT (BASEBAND RESOURCE B)
3E2···RAKE UNIT (BASEBAND RESOURCE B)
3E3···CODEC UNIT (BASEBAND RESOURCE B)
3E4···HHO-INFORMATION WRITE-IN/READ-IN UNIT
          (BASEBAND RESOURCE B)
3F···ATM CELL COMPOSITION UNIT

FIG. 4

CFN GENERATION MESSAGE IN CFN GENERATION UNIT

| D15 | D0 |
|---|---|
| SOURCE BASEBAND RESOURCE INFORMATION | |
| DESTINATION BASEBAND RESOURCE INFORMATION | |
| CFN (VALUE: 0 TO 255) | |

INFOMARION MESSAGE IN HHO-INFORMATION WRITE-IN/READ-IN UNIT

| D15 | D0 |
|---|---|
| RADIO-FRAME-SYNCHRONIZATION IDENTIFICATION INFORMATION (FROM CODEC UNIT) | |
| TRANSMISSION-POWER CONTROL INFORMATION (FROM CODEC UNIT) | |
| ACQUISITION PATH INFORMATION (FROM SEARCH UNIT) | |

FIG 5

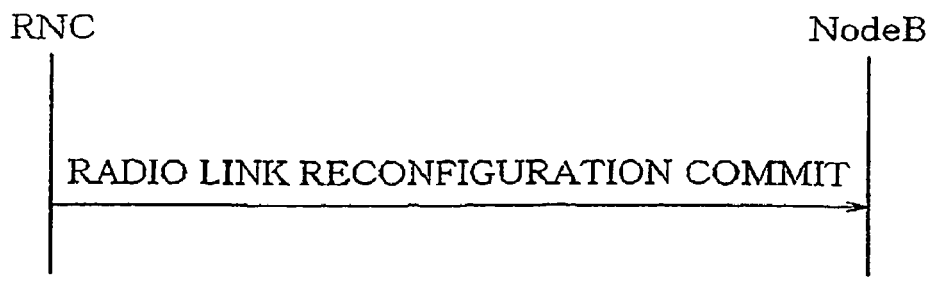

FIG. 6

| IE/Group Name | Presence | Range | IE Type and Reference | Semantic Description | Criticality | Assigned Criticality |
|---|---|---|---|---|---|---|
| Message Discriminator | M | | 9.2.1.45 | | | |
| Message type | M | | 9.2.1.46 | | YES | ignore |
| Node B Communication Context ID | M | | 9.2.1.48 | The reserved value "All NBCC" shall not be used. | YES | ignore |
| Transaction ID | M | | 9.2.1.62 | | | |
| CFN | M | | 9.2.1.7 | | YES | ignore |
| Active Pattern Sequence Information | O | | 9.2.2.A | | YES | ignore |

NON-INSTANTANEOUS HARD HANDOVER CONTROL DEVICE AND METHOD

TECHNICAL FIELD

The present invention relates to a non-instantaneous-disruption hard handover control device and method. More specifically, the present invention relates to a non-instantaneous-disruption hard handover control device and method, which are provided for a radio base station performing communication based on the CDMA (Code Division Multiple Access) technique, and perform drive-out control in the maintenance functions.

BACKGROUND ART

A radio base station uses handover control that finds a new baseband resource (destination baseband resource) capable of allowing a call communicating in a baseband resource to autonomously continue the communication and thus allows the call to continue the communication by using this new resource.

With reference to FIGS. 5 through 8, the following describes non-instantaneous-disruption hard handover control (hereinafter referred to as non-instantaneous-disruption HHO) in a radio base station (hereinafter referred to as Node-B) specified in the conventional 3rd Generation Partnership Project (hereinafter referred to as 3GPP) TS25.433.

FIG. 5 shows a non-instantaneous-disruption HHO sequence between a radio network controller (hereinafter referred to as an RNC) and a Node-B. FIG. 6 shows details of a radio link reconfiguration commit message sent from the RNC to the Node-B. The non-instantaneous-disruption HHO sequence in FIG. 5 occurs when the Node-B establishes a new radio link. At this time, it is assumed that a radio synchronization link configuration procedure is completed normally. Upon completion of the radio synchronization link configuration procedure, the Node-B changes the radio link using a connection frame number (hereinafter referred to as a CFN) that arrives next. As shown in FIG. 6, the CFN is contained in the radio link reconfiguration commit message from the RNC. The radio link handover using the CFN completes the non-instantaneous-disruption HHO.

With reference to FIGS. 7 and 8, the following describes the non-instantaneous-disruption HHO performed for a call communicating in the baseband resource, by using a baseband signal block 706 in a Node-B 703 according to CFN notification from an RNC 711. FIG. 7 is a block diagram showing the configuration of a conventional mobile communication system using the CDMA technique. FIG. 8 is a block diagram showing the configuration of the baseband signal block 706 in FIG. 7. For communication in the mobile communication system using the CDMA technique as shown in these diagrams, the RNC 711 first establishes a radio link with a call-process/maintenance-process monitoring block 709 in the Node-B 703 via a wired transmission path 710. The radio link information is temporarily stored in the call-process/maintenance-process monitoring block 709 in the Node-B 703, and is then transferred to a search block 802a, a rake block 803a, and a codec block 804a (FIG. 8) in a baseband resource A 801a of the baseband signal block 706.

The following describes processings in an upstream signal line 805. An upstream signal from a mobile station 701 is input to an RX unit of a TX/RX AMP unit 704 in the Node-B 703 via a radio transmission path 702 and is A/D converted in an A/D & D/A conversion block 705. The converted signal is transferred to a baseband resource A 801a in the baseband signal block 706 via the upstream signal line 805. The baseband resource A 801a allows the search block 802a to perform multi-path detection and path tracking. The baseband resource A 801a then allows the rake block 803a to perform channel estimation, SIR detection, and RAKE combination. The baseband resource A 801a then allows the codec block 804a to perform a decode process (error correction process) for the RAKE-combined upstream signal and perform downstream transmission power control. The decoded upstream signal is transferred to an ATM cell composition block 707 for ATM cell conversion. A transmission I/F black 708 band-limits the ATM cell for each signal. The signal is then transmitted to the RNC 711 via the wired transmission path 710.

The following describes processings in a downstream signal line 806. A downstream signal from the RNC 711 is input to the transmission path I/F block 708 via the wired transmission path 710. After the ATM cell is detected, the downstream signal is transferred to the ATM cell composition block 707 for ATM cell conversion. The downstream signal is then input to the baseband resource A 801a in the baseband signal block 706 via the downstream signal line 806. The baseband resource A 801a allows the codec block 804a to perform encoding processes (CRC generation process and error correction process) and upstream transmission power control for the downstream signal. The encoded downstream signal is D/A converted in the A/D & D/A conversion block 705. The downstream signal is transferred to the TX section of the TX/RX AMP unit 704 and then is transmitted to the mobile station 701 via the radio transmission path 702.

The above-described processings are likewise performed in another baseband resource B 801b (search block 802b, rake block 803b, codec block 804b) disposed in the baseband signal block 706. During communication of upstream signals/downstream signals, the call-process/maintenance-process monitoring block 709 manages call processings and maintenance processings in the Node-B 703.

The following describes processings for the non-instantaneous-disruption HHO performed by the Node-B 703 according to notification from the RNC 711. In accordance with notification from the RNC 711, the Node-B 703 performs the non-instantaneous-disruption HHO for a call communicating in the baseband resource A 801a in the baseband signal block 706. At this HHO, the RNC 711 establishes a new radio link with the call-process/maintenance-process monitoring block 709 via the wired transmission path 710. The call-process/maintenance-process monitoring block 709 is then notified of the CFN as non-instantaneous-disruption HHO timing via the wired transmission path 710.

The new radio link configuration and the CFN information are temporarily stored in the call-process/maintenance-process monitoring block 709 and are transferred to the search block 802a, the rake block 803a, and the codec block 804a in the baseband resource A 801a in the baseband signal block 706. The search block 802a, the rake block 803a, and the codec block 804a store therein the notified new radio link information and the CFN. These blocks switch the signal processings between upstream line signals and downstream line signals so as to perform processings based on the radio link information before the configuration until the CFN−1 timing is notified and to perform processings based on the new radio link information after the CFN timing is notified.

For generating the CFN which functions as non-instantaneous-disruption HHO timing, it is performed to compare the upstream CFNs used in the search block 802a, the rake block 803a, and the codec block 804a for upstream line signals with the downstream CFN used in the codec block 804a for downstream line signals.

During the signal processings for upstream line signals, the search block 802a calculates an upstream CFN (regularly updated every 10 ms per radio frame) from the reference frame timing for multi-path detection. The search block 802a compares the calculated upstream CFN with the notified CFN. The rake block 803a calculates an upstream CFN (regularly updated every 10 ms per radio frame) to be used as the reference frame timing for RAKE combination. The rake block 803a compares the calculated upstream CFN with the notified CFN. The codec block 804a calculates an upstream CFN (regularly updated every 10 ms per radio frame) to be used as the reference frame for RAKE-combined data transferred from the rake block 803a during the decoding process. The codec block 804a compares the calculated upstream CFN with the notified CFN. These blocks each calculates and stores upstream CFN calculation timing. As a result, an information transfer delay can be limited to an allowable range. Thus, the upstream line signal can be switched without an instantaneous disruption.

During the signal processing for downstream line signals, the codec block 804a calculates: CFN information concomitant with the downstream signal converted into the ATM cells in the ATM cell composition block 707; and the downstream CFN (regularly updated every 10 ms per radio frame) to be used as the reference frame during the encoding processes. The codec block 804a compares the calculated upstream CFN with the notified CFN. If there is no downstream line signal converted into ATM cells, the codec block 804a switches the downstream line signals based on the CFN to be used as the reference frame for the autonomous code process. The codec block 804a calculates and stores the downstream CFN calculation timing. Since no information transfer is performed, downstream line signals can be switched without an instantaneous disruption.

The non-instantaneous-disruption HHO process uses the baseband resource A 801a before the HHO occurring. The resource stores therein the information needed before the handover timing such as acquired path information in the search block 802a and transmission-power control information in the codec block 804a. That is, the non-instantaneous-disruption HHO can be easily implemented so long as the search block 802a, the rake block 803a, and the codec block 804a respectively keep track of the CFN occurring as the handover timing.

However, there is another hard handover control technique wherein the Node-B 703 finds a new destination baseband resource capable of continued communication for a call communicating in the source baseband resource and allows the call to communicate using the new resource. That hard handover control corresponds to the drive-out control, one of the maintenance functions of a radio base station.

Since the Node-B 703 autonomously performs the drive-out control, a then-communicating call requires hard handover without a instantaneous disruption. General procedures are specified for each Node-B 703 and may allow a situation where the instantaneous disruption is inevitable. Currently, there is no specified procedure used as the reference for unification. The drive-out control is also expected to reliably implement the non-instantaneous-disruption HHO without affecting a communicating call.

DISCLOSURE OF THE INVENTION

It is an object of the present invention to provide non-instantaneous-disruption hard handover control device and method, for use in a radio base station (Node-B) using the current CDMA technique, using a hard handover control (drive-out control) that can find a new destination baseband resource capable of continued communication for a call communicating in a source baseband resource, to thereby allow the call to communicate without an instantaneous disruption while using the new resource.

It is another object of the present invention to provide non-instantaneous-disruption hard handover control device and method for use in Node-B using a next-generation mobile communication technique, that can provide drive-out control without an instantaneous disruption.

The present invention provides, in a first aspect thereof, a non-instantaneous-disruption hard handover (HHO) control device, disposed in a radio base station using a code-division-multiple-access (CDMA) technique, for switching a call from a source baseband resource to a destination baseband resource, the HHO control device including a CFN message generation block (110), provided in a call-processing/maintenance processing block, for generating a connection frame number (CFN) which specifies a handover timing.

The present invention also provides, in a second aspect thereof, a method for handover from a source baseband resource to a destination baseband resource without an instantaneous disruption in a radio communication system using a CDMA technique, the method including the step of generating a CFN message including a connection frame number (CFN) specifying a handover timing in a radio base station.

BRIEF DESCRIPTION OF THE DRAWINGS

FIG. 3 is a flowchart showing a radio signal process sequence in the present embodiment;

FIG. 4 is a diagram showing message formats used in the CFN generation block and the HHO-information write-in/read-in unit in the present embodiment;

FIG. 5 is a diagram showing a message flow for non-instantaneous-disruption HHO between an RNC and a Node-B, illustrating the non-instantaneous-disruption HHO in the conventional technique;

FIG. 6 is a diagram showing the details of a message "RADIO LINK RECONFIGURATION COMMIT" shown in FIG. 5;

BEST MODE FOR CARRYING OUT THE INVENTION

Figure 1:
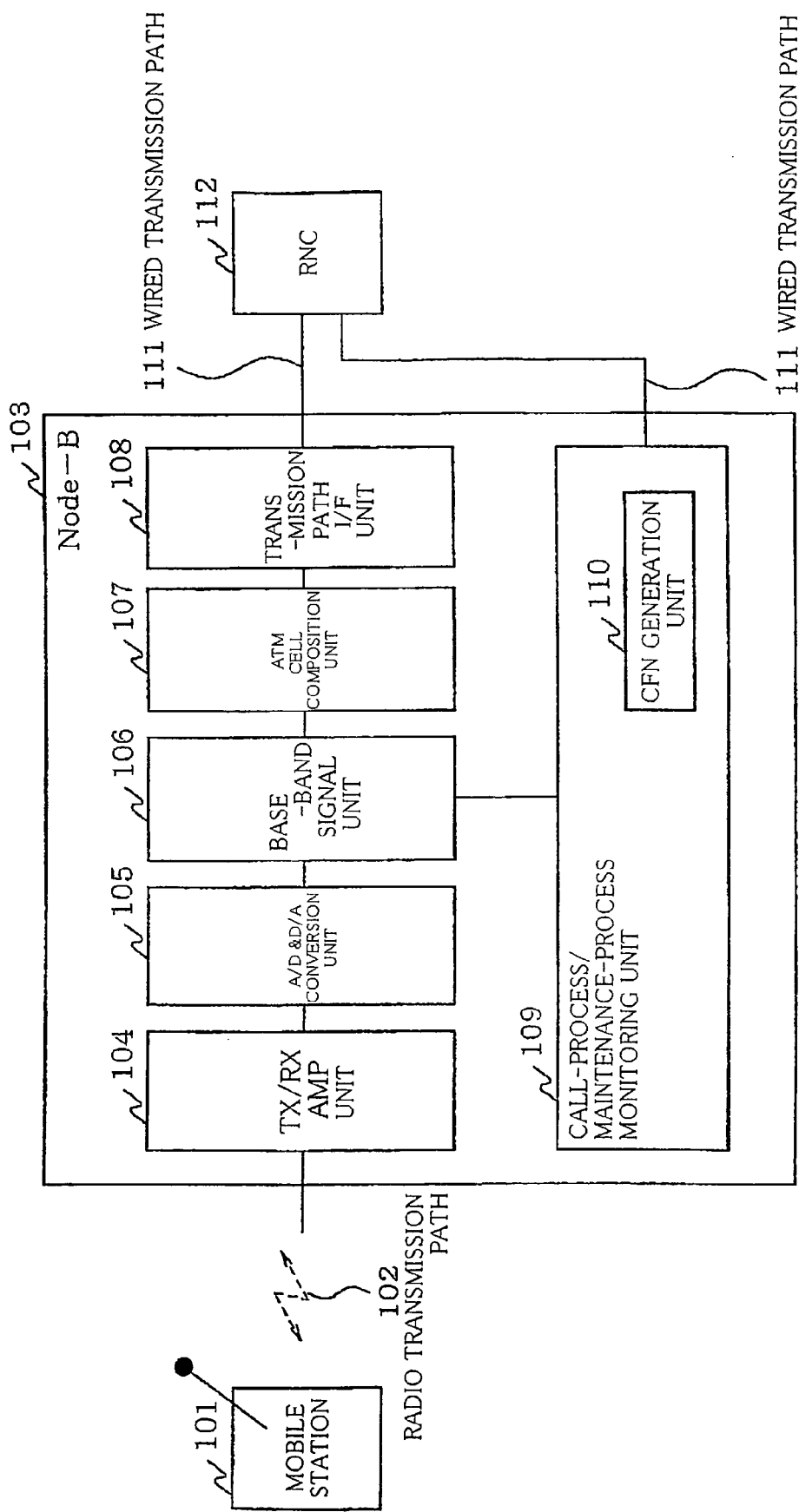
FIG. 1 is a block diagram of a mobile communication system using a CDMA technique according to an embodiment of the present invention.

The present invention will be described in further detail based on an embodiment of the present invention. FIG. 1 shows a mobile communication system using a CDMA technique, according to the embodiment of the present invention. The mobile communication system includes a mobile station 101, a Node-B 103, and an RNC 112. The mobile station 101 and the Node-B 103 are connected to each other via a radio transmission path 102. The RNC 112 and the Node-B 103 are connected to each other via a wired transmission path 111. The Node-B 103 includes a TX/RX AMP unit 104, an A/D & D/A conversion unit (block) 105, a baseband signal unit (block) 106, an ATM cell composition unit (block) 107, a transmission path I/F unit (block) 108, and a call-process/maintenance-process monitoring unit (block) 109. The call-process/maintenance-process monitoring block 109 includes therein a CFN generation unit (block) 110.

Figure 2:
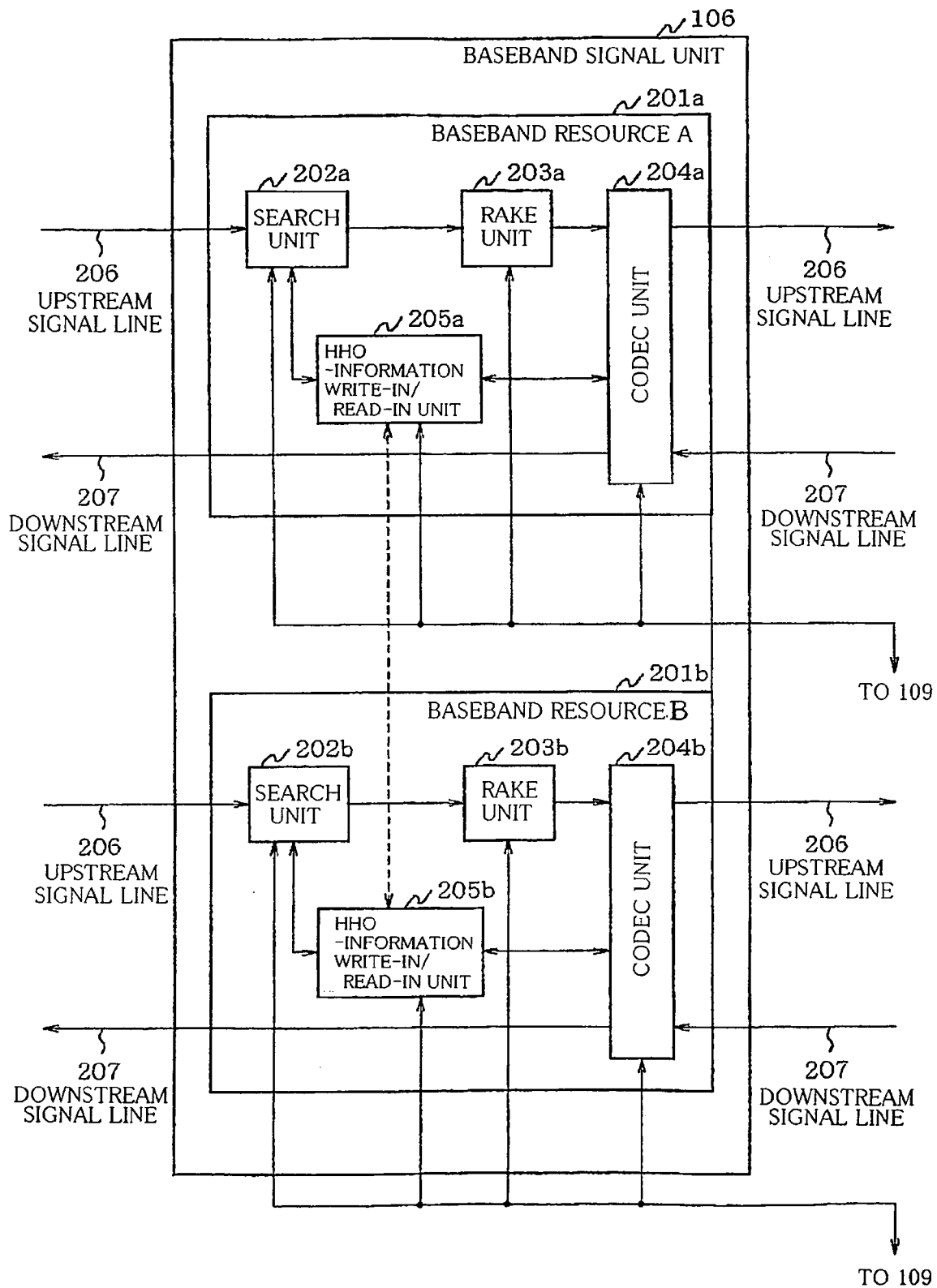
FIG. 2 is a block diagram of the baseband signal block shown in FIG. 1.
Figure 7:
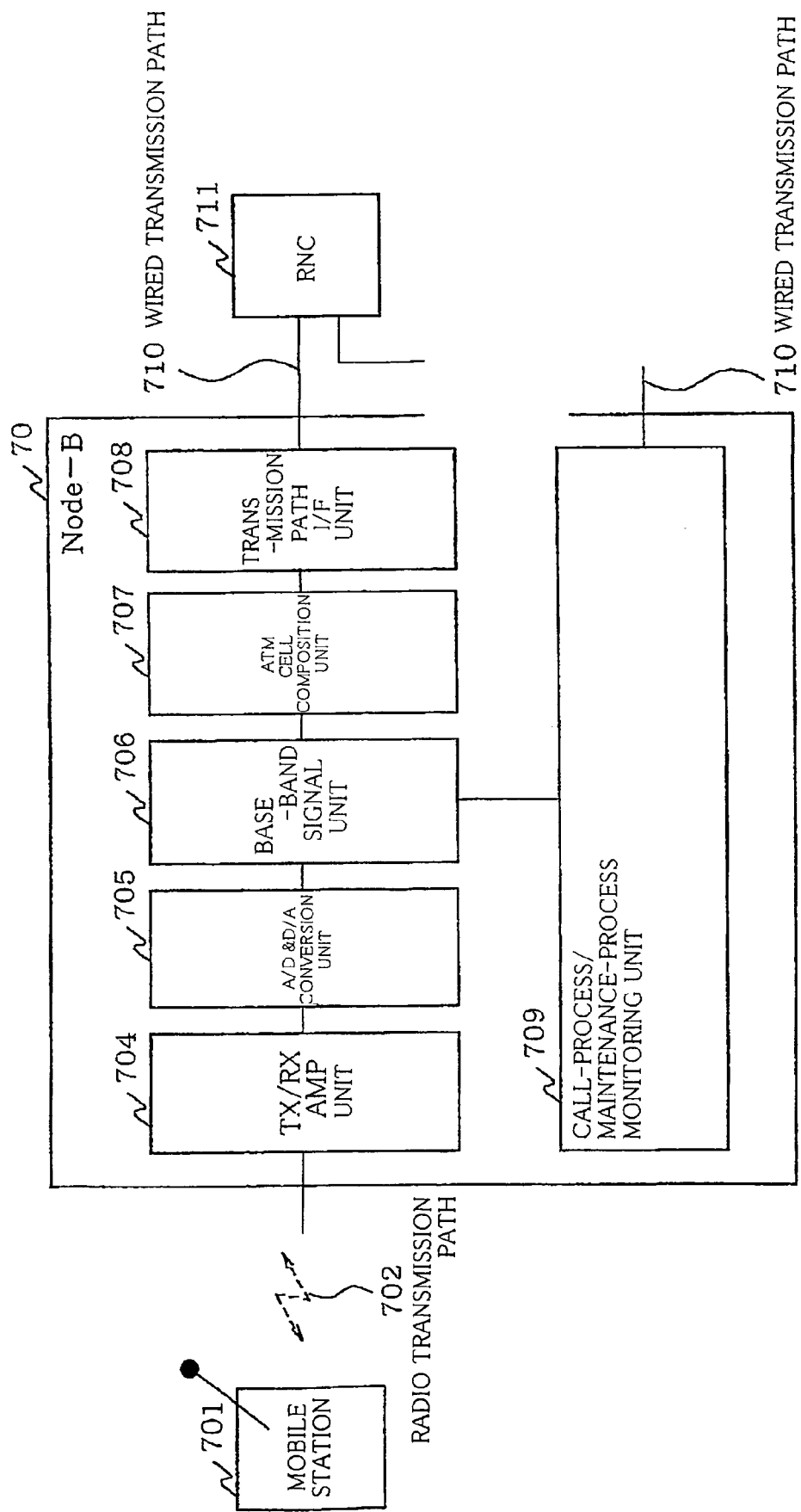
FIG. 7 is a block diagram of a mobile communication system using a CDMA technique, illustrating the non-instantaneous-disruption HHO in the conventional technique.
Figure 8:
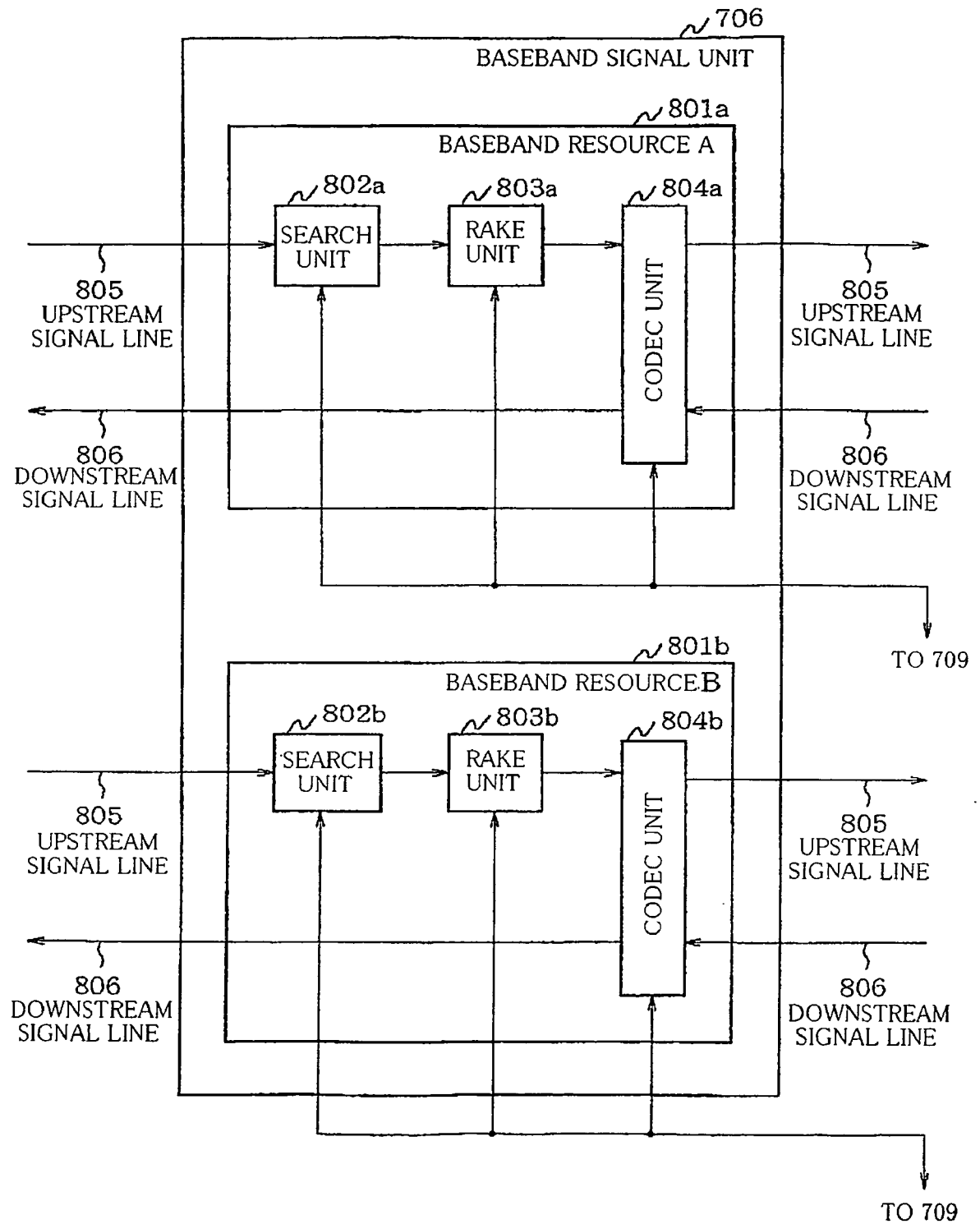
FIG. 8 is a block diagram of the baseband signal processing block shown in FIG. 7.

FIG. 2 shows the configuration of the baseband signal block 106 in the present embodiment. The baseband signal block 106 includes a baseband resource A 201a and a baseband resource B 201b that can operate independently of each other. The baseband resource A 201a and the baseband resource B 201b transmit or receive data from the outside via an upstream signal line 206, a downstream signal line 207, and the like.

In FIG. 2, the baseband resource A 201a and the baseband resource B 201b each includes a search unit (block) 202a or 202b, a rake unit (block) 203a or 203b, a codec unit (block) 204a or 204b, and an HHO-information write-in/read-in unit (device) 205a or 205b.

It is assumed in FIGS. 1 and 2 that the handover control finds a new destination baseband resource capable of continued communication for a call communicating in the baseband resource and provides hard handover control to the call for performing communication using the new resource. For the drive-out control, the CFN generation block 110 generates a CFN to be used as handover timing for the drive-out control, information as to the source baseband resource, and information as to the destination baseband resource. Via the call-process/maintenance-process monitoring block 109, the CFN generation block 110 transfers the generated CFN message to: a search block 202a (source-resource search block 202a), a rake block 203a (source-resource rake block 203a), a codec block 204a (source-resource codec block 204a), and an HHO-information write-in/read-in unit 205a (source-resource HHO-information write-in/read-in unit 205a) in the source baseband resource A 201a of the baseband signal block 106; and a search block 202b (destination-resource search block 202b), a rake block 203b (destination-resource rake block 203b), a codec block 204b (destination-resource codec block 204b), and an HHO-information write-in/read-in unit 205b (destination-resource HHO-information write-in/read-in unit 205b) in the baseband resource B 201b (to-be destination baseband resource 201b).

To provide the drive-out control in FIG. 2, the source-resource search block 202a transfers acquired path information to the source-resource HHO-information write-in/read-in unit 205a. The source-resource codec block 204a transfers radio-frame-synchronization identification information and transmission-power control information to the source-resource HHO-information write-in/read-in unit 205a. The source-resource HHO-information write-in/read-in unit 205a transfers these pieces of information (information messages) to the destination-resource HHO-information write-in/read-in unit 205b. The destination-resource HHO-information write-in/read-in unit 205b reads the transferred radio information. The destination-resource HHO-information write-in/read-in unit 205b transfers the acquired path information. The destination-resource HHO-information write-in/read-in unit 205b transfers the radio-frame-synchronization identification information and the transmission-power control information to the destination-resource codec block 204b.

In accordance with the present embodiment, the baseband signal block 106 has two baseband resources A and B. However, the baseband signal block 106 may have a plurality of baseband resources C, D, and so on and each of the other blocks in the baseband block may have similar configuration.

The following describes specific operation examples with reference to FIGS. 3 and 4. FIG. 3 shows a sequence flow for radio signal processings in the drive-out control according to the present embodiment, which are performed in: an A/D & D/A conversion block 3A; a call-process/maintenance-process monitoring block 3B; a CFN generation block 3C; a search block 3D1 (source-resource search block 3D1), a rake block 3D2 (source-resource rake block 3D2), a codec block 3D3 (source-resource codec block 3D3), and an HHO-information write-in/read-in unit 3D4 (source-resource HHO-information write-in/read-in unit 3D4) in a source baseband resource A 201a; and a search block 3E1 (destination-resource search block 3E1), a rake block 3E2 (destination-resource rake block 3E2), a codec block 3E3 (destination-resource codec block 3E3), an HHO-information write-in/read-in unit 3E4 (destination-resource HHO-information write-in/read-in unit 3E4), and an ATM cell composition block 3F in a destination baseband resource B 201b.

FIG. 4 shows a CFN generation message in the CFN generation block 3C and a radio information message in the HHO-information write-in/read-in units 3D4 and 3E4. The radio information message includes radio-frame-synchronization identification information, transmission-power control information, and acquired path information.

Prior to providing the drive-out control for a communicating call in FIG. 3, the call-process/maintenance-process monitoring block 3B, in process 301, issues an instruction to notify generation of a CFN capable of non-instantaneous-disruption HHO to the CFN generation block 3C. After receiving the instruction for CFN generation notification, the CFN generation block 3C generates a CFN in process 302. The CFN generation block 3C notifies the generated CFN to the call-process/maintenance-process monitoring block 3B based on the CFN generation message generated by the CFN generation block shown in FIG. 4. The CFN generation message contains source baseband resource information, destination baseband resource information, and a CFN specifying the handover timing. The source baseband resource information and the destination baseband resource information are needed for the drive-out control and are used for source resource nodes and destination resource nodes.

The call-process/maintenance-process monitoring block 3B receives the CFN generation message. In process 303, the call-process/maintenance-process monitoring block 3B transfers the CFN generation message to: a source-resource search block 3D1, a source-resource rake block 3D2, a source-resource codec block 3D3, and a source-resource HHO-information write-in/read-in unit 3D4 in the source baseband resource A 201a; and a destination-resource search block 3E1, a destination-resource rake block 3E2, a destination-resource codec block 3E3, and a destination-resource HHO-information write-in/read-in unit 3E4 in the baseband resource B 201b to become a destination resource.

The source-resource codec block 3D3 in the source baseband resource A 201a receives the CFN generation message from the call-process/maintenance-process monitoring block 3B. In process 304, the source-resource codec block 3D3 notifies the radio-frame-synchronization identification information and the transmission-power control information at the present moment to the source-resource HHO-information write-in/read-in unit 3D4.

The source-resource search block 3D1 in the source baseband resource A 201a receives the CFN generation message from the call-process/maintenance-process monitoring block 3B. In process 305, the source-resource search block 3D1 notifies the acquired path information at the present moment to the source-resource HHO-information write-in/read-in unit 3D4.

The source-resource HHO-information write-in/read-in unit 3D4 in the source baseband resource A 201a references the information about the source baseband resource in the CFN generation message transferred via the call-process/maintenance-process monitoring block 3B to identify the to-be destination baseband resource B 201b. In process 306, the source-resource HHO-information write-in/read-in unit 3D4, so as not to exceed the CFN occurring as the handover timing, transfers the acquired path information from the source-resource search block 3D1 and the radio-frame-synchronization identification information and the transmission-power control information from the source-resource codec block 3D3 to the destination-resource HHO-information write-in/read-in unit 3E4 in the destination baseband resource B 201b. That is, the source-resource HHO-information write-in/read-in unit 3D4 transfers the information message (radio information) shown in FIG. 4.

The above-described processings complete the information transfer from the source baseband resource A 201a to the destination baseband resource B 201b.

Subsequently, the source-resource search block 3D1, the source-resource rake block 3D2, and the source-resource codec block 3D3 in the source baseband resource A 201a perform signal processings until the timing CFN−1 immediately before the handover timing.

Process 308 relates to upstream line signals at timing (time) CFN−1 (CNF−2 indicates a CFN which precedes the current CFN by two). After the A/D & D/A conversion block 3A A/D-converts an upstream signal, the source-resource search block 3D1 uses the converted upstream signal to calculate an upstream CFN according to the reference frame timing for performing the multi-path detection. The source-resource search block 3D1 compares the calculated CFN with the CFN to be used as the notified handover timing and then performs the multi-path detection and the path tracking. The source-resource rake block 3D2 also calculates an upstream CFN to be used as the reference frame timing for RAKE combination. The source-resource rake block 3D2 compares the calculated CFN with the CFN to be used as the handover timing and then performs the channel estimation, the SIR detection, and the RAKE combination. When performing the decode process, the source-resource codec block 3D3 also calculates an upstream CFN to be used as the reference frame for RAKE-combined data transferred from the source-resource rake block 3D2. The source-resource codec block 3D3 compares the calculated CFN with the CFN to be used as the handover timing, and then performs the decode process (error correction process) for the RAKE-combined upstream signal. The source-resource codec block 3D3 transfers the decoded upstream signal to the ATM cell composition block 3F.

Process 309 relates to downstream line signals at the CFN−2 timing (time). The source-resource codec block 3D3 uses a downstream signal converted into ATM cells in the ATM cell composition block 3F and calculates CFN information concomitant with the downstream signal converted into the ATM cells and a downstream CFN to be used as the reference frame for the encoding process. The source-resource codec block 3D3 compares the calculated CFN with the CFN to be used as the handover timing. If there is no downstream signal converted into ATM cells, the source-resource codec block 3D3 compares the CFN which is to become the reference frame for the autonomous code process with the CFN to be used as the handover timing, and then performs the encoding processes (CRC generation process and error correction process) and the upstream transmission power control for the downstream signal. The source-resource codec block 3D3 transfers the encoded downstream signal to the A/D & D/A conversion block 3A.

Process 310 relates to upstream line signals at the CFN−1 timing (time). Process 311 relates to downstream line signals at the CFN−1 timing and performs the process similar to the processings 308 and 309.

At the handover timing (time), CFN, in process 312, the call-process/maintenance-process monitoring block 3B issues an instruction to release the baseband resource to the source-resource search block 3D1, the source-resource rake block 3D2, the source-resource codec block 3D3, and the source-resource HHO-information write-in/read-in unit 3D4 in the baseband resource A 201a.

In this manner, the signal processings in the baseband resource A 201a completes under the drive-out control.

The destination-resource HHO-information write-in/read-in unit 3E4 in the destination baseband resource B 201b performs processings in accordance with the information transferred from the source-resource HHO-information write-in/read-in unit 3D4 in the source baseband resource A 201a. In process 307, the destination-resource HHO-information write-in/read-in unit 3E4 notifies the acquired path information to destination-resource search block 3E1 and the radio-frame-synchronization identification information and the transmission-power control information to the destination-resource codec block 3E3.

Based on the acquired path information, the destination-resource search block 3E1 starts the multi-path detection and the path tracking before the handover timing, CFN.

Based on the radio-frame-synchronization identification information and the transmission-power control information, the destination-resource codec block 3E3 prepares to perform the upstream signal decode process (error correction process), the downstream transmission power control, the downstream signal encoding processes (CRC generation process and error correction process), and the upstream transmission power control from the handover timing, CFN.

The above-described process is completed before the CFN occurring as the handover timing. By performing this process in advance, the processings after the CFN occurring as the handover timing can be continued without instantaneous disruption.

Thereafter, the destination-resource search block 3E1, the destination-resource rake block 3E2, and the destination-resource codec block 3E3 do not perform signal processings for the upstream signal line 206 and the downstream signal line 207, before the CFN occurs as the handover timing.

Process 308 relates to upstream line signals at the CFN−2 timing (time). The destination-resource search block 3E1 uses an upstream signal A/D-converted in the A/D & D/A conversion block 3A to start the multi-path detection and the path tracking based on the transferred acquired path information even before the handover timing. In this case, however, the destination-resource search block 3E1 does not notify acquired path to the destination-resource rake block 3E2. The destination-resource rake block 3E2 and the destination-resource codec block 3E3 each compares the current frame with an upstream CFN to be used as the reference frame and perform no signal processings for the current frame.

Process 309 relates to downstream line signals at the CFN−2 timing (time). The destination-resource codec block 3E3 uses a downstream signal converted into ATM cells in the ATM cell composition block 3F to compare the current frame with a downstream CFN to be used as the reference frame and perform no signal processings for the current frame. If there is no downstream signal converted into ATM cells, the destination-resource codec block 3E3 compares the CFN which is to become the reference frame for the autonomous code process with the current frame and performs no signal processings for the current frame.

Process 310 relates to upstream line signals at the CFN−1 timing (time). Process 311 relates to downstream line signals at the CFN−1 timing and performs the same as the processings 308 and 309.

Process 313 relates to upstream line signals at the CFN to be used as the handover timing (time). The destination-resource search block 3E1 uses an upstream signal A/D-converted in the A/D & D/A conversion block 3A to calculate an upstream CFN from the reference frame timing for performing the multi-path detection. The destination-resource search block 3E1 compares the calculated upstream CFN with the notified CFN and then continues the multi-path detection and the path tracking that are performed before the CFN. The destination-resource rake block 3E2 also calculates an upstream CFN to be used as the reference frame timing for RAKE combination. The destination-resource rake block 3E2 compares the calculated CFN with the CFN to be used as the handover timing and then performs the channel estimation, the SIR detection, and the RAKE combination.

When performing the decode process, the destination-resource codec block 3E3 also calculates an upstream CFN to be used as the reference frame for RAKE-combined data transferred from the destination-resource rake block 3E2. The destination-resource codec block 3E3 compares the calculated upstream CFN with the CFN to be used as the handover timing and then validates the transferred radio-frame-synchronization identification information and transmission-power control information at this time. The destination-resource codec block 3E3 then performs the decode process (error correction process) and the downstream transmission power control for the RAKE-combined upstream signal and transfers the decoded upstream signal to the ATM cell composition block 3F.

Process 314 relates to downstream line signals at the CFN timing (time). The ATM cell composition block 3F uses a downstream signal converted into ATM cells in the ATM cell composition block 3F to calculate the CFN information concomitant with the downstream signal converted into the ATM cells and a downstream CFN to be used as the reference frame for performing the encoding process. The ATM cell composition block 3F compares the calculated downstream CFN with the CFN to be used as the handover timing. If there is no downstream signal converted into ATM cells, the ATM cell composition block 3F compares the calculated downstream CFN with the CFN which is to become the reference frame for the autonomous code process. The ATM cell composition block 3F then validates the transferred radio-frame-synchronization identification information and transmission-power control information at this time. The ATM cell composition block 3F performs the downstream signal encoding processes (CRC generation process and error correction process) and the upstream transmission power control. The ATM cell composition block 3F transfers the encoded downstream signal to the A/D & D/A conversion block 3A.

Process 315 relates to upstream line signals at the CFN+1 timing (time). Process 316 relates to downstream line signals at the CFN+1 timing and performs the processing similar to the processings 313 and 314.

Subsequently, the destination-resource search block 3E1, the destination-resource rake block 3E2, and the destination-resource codec block 3E3 perform similar processings. At the CFN occurring as the handover timing in process 312, the baseband resource A 201a is released to thereby complete the drive-out control. As described above, the processing 308 through processing 316 are performed so as to avoid duplicate signal processings for upstream and downstream line signals.

The non-instantaneous-disruption hard handover control device according to the embodiment provides the advantages as described hereinafter. Firstly, it is possible to avoid duplicate signal processings for upstream line signals and downstream line signals based on the drive-out control. The reason is as follows. The non-instantaneous-disruption hard handover control device generates CFNs to be used as handover timings during the drive-out control. Accordingly, it is possible to determine timings to start or stop signal processings for the upstream and downstream signal lines in the source baseband resource and in the destination baseband resource.

Secondly, the non-instantaneous-disruption hard handover control device can implement the hard handover control during the drive-out control by maintaining the radio state of the source baseband resource. The reason is as follows. Under the drive-out control, the non-instantaneous-disruption hard handover control device transfers the acquired path information, the radio-frame-synchronization identification information, and the transmission-power control information in the source baseband resource to the destination baseband resource. The processings are continued in the destination baseband resource.

Thirdly, the non-instantaneous-disruption hard handover control device can implement the hard handover control without an instantaneous disruption during the drive-out control. The reason is as follows. The non-instantaneous-disruption hard handover control device autonomously generates CFNs to be used as handover timings described in connection with the first advantage. Based on the acquired path information in the source baseband resource described in the second effect, the destination baseband resource continues the multi-path detection and the path tracking before the CFN occurring as the handover timing. Based on the radio frame synchronization information and the transmission-power control information in the source baseband resource, the destination baseband resource continues processings by validating the information from the CFN occurring as the handover timing.

Fourthly, the non-instantaneous-disruption hard handover control method according to the present invention can be used to provide a consistent reference throughout the system when performing the drive-out control for any Node-B in all next-generation mobile communication systems using the similar baseband resource.

The invention claimed is:

1. A non-instantaneous-disruption hard handover (HHO) control device disposed in a radio base station using a CDMA technique, for handover of a call from a source baseband resource to a destination baseband resource, said HHO control device comprising a call-processing/maintenance processing monitoring block for receiving radio link information including information of said source baseband resource and information of said destination baseband resource, from a host radio network controller (RNC) managing baseband resource information, for management of said radio link information by said call-processing/maintenance processing monitoring block, characterized in that:

a CFN message generation block (110) for generating a connection frame number (CFN) which specifies a handover timing is provided in said call-processing/maintenance processing monitoring block (109); and each of baseband signal blocks provided in a baseband signal unit includes:

a search block for generating acquired path information of a corresponding said baseband resource;

a codec block for generating radio-frame-synchronization identification information and transmission-power control information of a corresponding baseband resource; and an HHO-information write-in/read-in block for collecting non-instantaneous-disruption HHO information including radio-frame-synchronization identification information, transmission-power control information, and acquired path information of a corresponding baseband resource.

2. The non-instantaneous-disruption HHO control device according to claim 1, wherein said baseband signal block of said source baseband resource transfers said source band band resource HHO information to said HHO-information write-in/read-in block of said destination baseband resource, upon receiving said CFN message, and wherein said HHO-information write-in/read-in block of said destination baseband resource transfers, before said CFN occurring, said acquired path information of said source baseband resource to said search block of said destination baseband resource and said radio-frame-synchronization identification information and said transmission-power control information to said codec block of said destination baseband resource.

3. The non-instantaneous-destination HHO control device according to claim 2, wherein said search block of said destination baseband resource generates said acquired path information of said source baseband resource before said CFN occurring, and said codec block of said destination baseband resource generates said radio-frame-synchronization identification information and transmission-power control information of said destination baseband resource after said CFN occurring.

4. The non-instantaneous-disruption HHO-information control device according to claim 1, wherein said HHO write-in/read-in block stores therein said non-instantaneous-disruption HHO information of an uplink radio frame or a downlink radio frame.

5. A method for handover from a source baseband resource to a destination baseband resource without an instantaneous disruption in a radio communication system using a CDMA technique, said method comprising the step of:

generating in a radio base station a CFN message including a connection frame number (CFN) specifying a handover timing, information of said source baseband resource and information of said destination baseband resource;

generating acquired path information, radio-frame-synchronization identification information and transmission-power information of each of said source baseband resource and said destination baseband resource; and storing non-instantaneous-disruption HHO information including said acquired path information, radio-frame-synchronization identification information and transmission-power control information.

6. The method according to claim 5, wherein said non-instantaneous-disruption HHO information of said source baseband resource is transferred to said destination baseband resource upon receiving said CFN message, and said acquired path information of said destination baseband resource is generated prior to said CFN occurring.

7. The method according to claim 5, wherein said non-instantaneous-disruption HHO information is HHO information of an uplink radio frame or a downlink radio frame.

* * * * *